United States Patent [19]

Pierart et al.

[11] 4,400,345
[45] Aug. 23, 1983

[54] NUCLEAR BOILER WITH CONCENTRIC TUBES AND REMOVABLE SAFETY SLEEVE

[75] Inventors: Robert Pierart, Nantes; Daniel Moutard, Maurepas, both of France

[73] Assignee: Commissariat a l'Energie Atomique, Paris, France

[21] Appl. No.: 197,909

[22] Filed: Oct. 17, 1980

[30] Foreign Application Priority Data

Oct. 30, 1979 [FR] France ................ 79 26871

[51] Int. Cl.³ ............................................. G21C 9/00
[52] U.S. Cl. ................................... 376/292; 376/393; 376/461
[58] Field of Search ............... 376/283, 285, 286, 292, 376/393, 404, 405, 461

[56] References Cited

U.S. PATENT DOCUMENTS

| | | | |
|---|---|---|---|
| 2,508,655 | 5/1950 | Silverman | 376/292 X |
| 3,249,508 | 5/1966 | Rachais | 376/393 X |
| 3,807,772 | 4/1974 | Delisle et al. | 376/292 X |
| 4,118,276 | 10/1978 | Hodzic et al. | 376/393 |
| 4,236,970 | 12/1980 | Harand et al. | 376/402 |
| 4,238,291 | 12/1980 | Nevenfeldt et al. | 376/292 X |
| 4,247,262 | 1/1981 | Lipstein | 376/402 X |

*Primary Examiner*—Peter A. Nelson

[57] ABSTRACT

Nuclear boiler comprising a vessel sealed in its upper part by a removable cover, a basket-shaped member carrying the reactor core and separating the vessel into a hot inner area and a cold outer area, at least one steam generator positioned within the vessel and comprising a tightly sealed enclosure and a tube plate separating the enclosure into a primary part or water box and a secondary part, the tube plate carrying U-tubes, whose ends issue into a cold area and a hot area of the water box, defined by an inner structure, two linear, coaxial tubes defining an inner pipe and an annular outer pipe respectively connecting the hot areas and cold areas of the vessel and the water box, wherein a removable safety sleeve, whose wall is designed to resist the pressure in the primary circuit, is arranged coaxially within the outer annular pipe and defines with the latter a calibrated clearance making it possible to limit to a given value the leakage flow if the outer tube fractures.

6 Claims, 2 Drawing Figures

NUCLEAR BOILER WITH CONCENTRIC TUBES AND REMOVABLE SAFETY SLEEVE

BACKGROUND OF THE INVENTION

The present invention relates to a nuclear boiler for a pressurized ordinary water reactor.

The invention more specifically relates to a nuclear boiler comprising a vessel sealed in its upper part by a removable cover, a basket-shaped member carrying the reactor core and separating the vessel into a hot inner area and a cold outer area, at least one steam generator positioned within the vessel and comprising a tightly sealed enclosure and a tube plate separating the enclosure into a primary part or water box and a secondary part, the tube plate carrying U-tubes, whose ends issue into a cold area and a hot area of the water box, defined by an inner structure, two linear, coaxial tubes defining an inner pipe and an annular outer pipe respectively connecting the hot areas and cold areas of the vessel and the water box.

Nuclear boilers of this type, which are also called pressurized ordinary water nuclear boilers are described in French Pat. No. EN 74 09517. In such boilers, the vessel is connected to the steam generator by linear, short tubes regrouping in the same envelope the outward and return flows of the primary fluid, i.e. the hot and cold connecting pipes.

If the connecting pipes are fractured, which constitutes one of the most serious accidents to be taken into consideration when designing a nuclear power station, boilers of this type have the advantage of providing a support securing the steam generators, i.e. only permitting a limited and controlled displacement thereof. However, the result obtained as a result of such support is not independent of the shape of the fracture. In other words, it is not possible to limit to a given value the leak caused by fracturing of the connecting pipes by supporting the steam generators.

BRIEF SUMMARY OF THE INVENTION

The object of the invention is the construction of a nuclear boiler of the type defined hereinbefore in which means are provided for limiting to a given value leaks from the primary circuit caused by an accidental fracture of the connecting pipes located between the vessel and each of the generators, no matter what the shape assumed by said fracture.

The present invention therefore relates to a nuclear boiler of the type defined hereinbefore, wherein a removable safety sleeve, whose wall is designed to resist the pressure in the primary circuit, is arranged coaxially within the outer annular pipe and defines with the latter a calibrated clearance making it possible to limit to a given value the leakage flow if the outer tube fractures.

The sleeve arranged within the outer pipe makes it possible to limit the leakage cross-section of the primary circuit to a given value, no matter what the shape of the fracture formed in the tube. Moreover, the safety sleeve according to the invention can be removed so as to permit the inspection of the boiler during operation. The sleeve also protects the connecting pipes from thermal shocks and cycles occurring during the transient periods associated with the variations in the primary fluid flow or power variations.

According to a preferred embodiment of the invention, each of the ends of the safety sleeve extends beyond the outer wall of the outer tube and defines with the inner wall thereof the calibrated clearance making it possible to limit the leakage flow.

According to another feature of the invention, the safety sleeve is connected to the inner tube by ribs, so as to form with said tube a monobloc or onepiece assembly. The inner tube can then be fixed in removable manner to the basket-shaped member carrying the core or to the inner structure of the water box and slide freely from the other side, the length of the monobloc assembly formed by the inner tube and the safety sleeve being less than the internal diameter of the vessel, in such a way that the assembly can be extracted via the latter after removing the cover.

According to yet another feature of the invention elastic annular elements are arranged between the safety sleeve and the inner wall of the outer tube, so as to support the safety sleeve and prevent vibrations.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
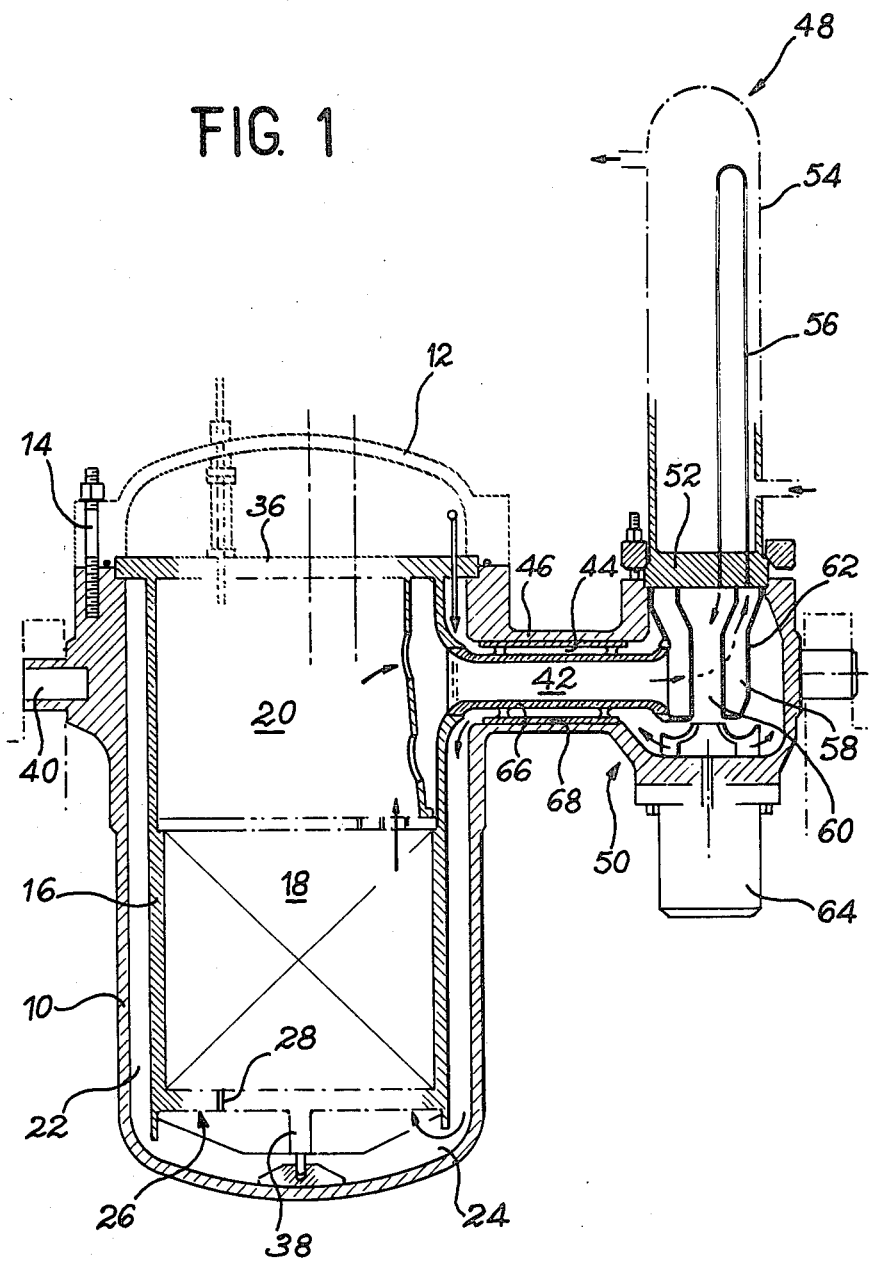
FIG. 1 a sectional view of the boiler of a pressurized water reactor, whose vessel is connected by coaxial connecting pipes, according to the invention, with a steam generator.

The nuclear boiler shown in FIG. 1 comprises a vessel 10 sealed in its upper part by a cover 13 fixed to the vessel 10 by stud bolts 14. Vessel 10 is cylindrical, of vertical axis and contains a basket-shaped member 16 carrying the reactor core 18. Member 16 thus separates the vessel 10 into a hot inner area 20, which is substantially cylindrical and a cold outer area 22, forming an annular space. A passage 24 is defined between the inner end of member 16 and the bottom of vessel 10 to permit the fluid from the cold area to enter the reactor core by passages 28 formed in a grating 26 fixed to member 16.

Basket-shaped member 16 is supported by a plate 36 secured between cover 12 and vessel 10 and centered with respect to the latter by means of a member 38.

One or more radial openings 40 are made in the wall of vessel 10, so as to permit the injection of an emergency cooling liquid in the case where the circulation of the primary liquid within vessel 10 is accidentally interrupted.

Steam generators 48, whereof only one is shown in FIG. 1, in each case comprise a tube plate 52 separating a primary part or water box 50 from a secondary part 54. The tube plate 52 carries U-tubes 56, whose ends issue then into two concentric areas 58 and 60 of water box 50 separated by an internal structure 62.

In the represented embodiment, a pump 64 located in the lower part of water box 50 and substantially in the axial extension of steam generator 48 is associated with each of the latter.

Figure 2:
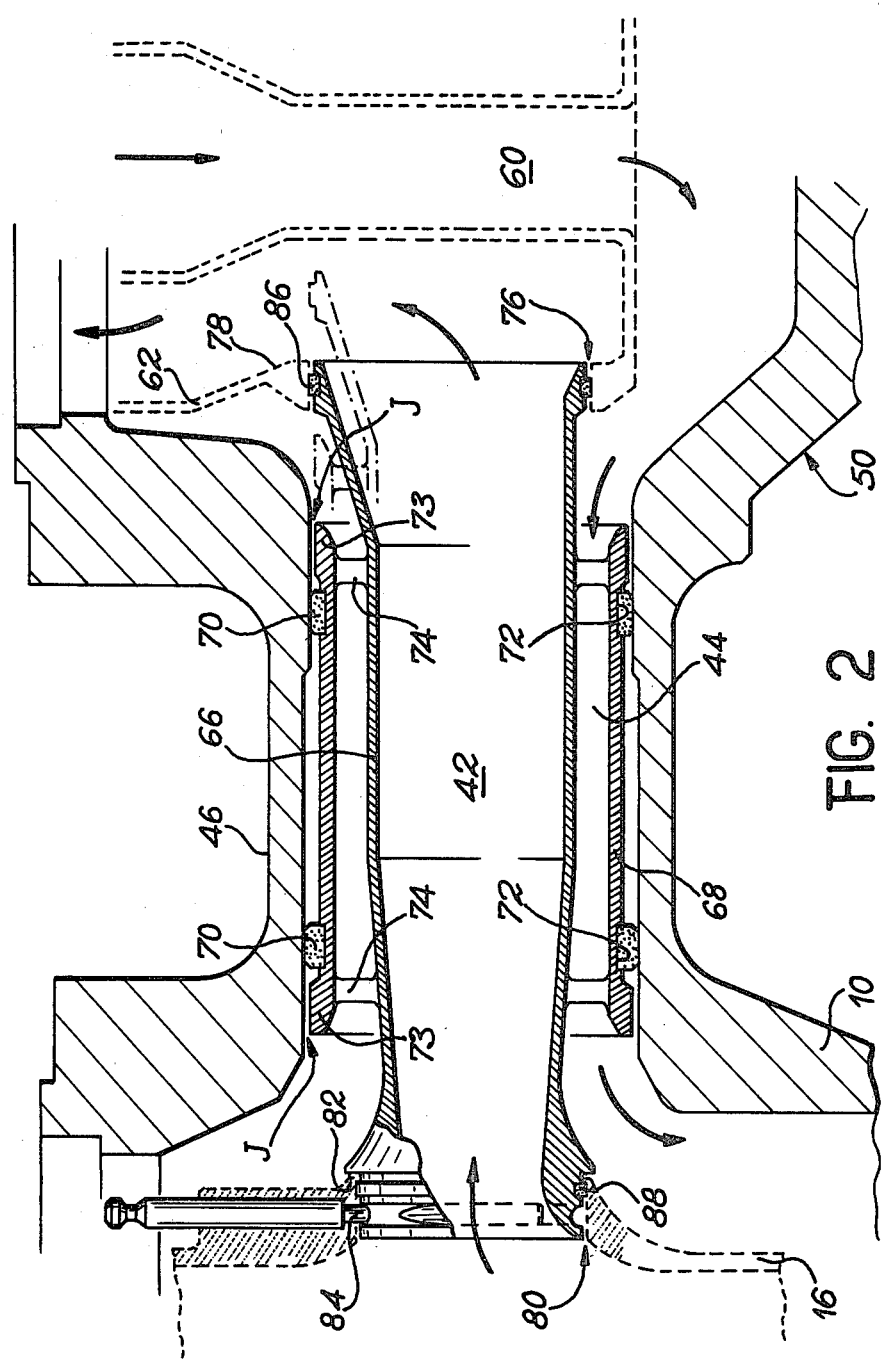
FIG. 2 a larger scale sectional view of the hot and cold connecting pipes connecting the vessel to the steam generator and of the safety sleeve arranged within the cold connecting pipe.

As illustrated in FIGS. 1 and 2, a relatively short, linear tube 46 is arranged radially relative to vessel 10, which it connects to water box 50. A tube 66 is arranged coaxially within tube 46 between the core-carrying member 16 and the internal structure 62 of the water box. Thus, tubes 46 and 66 define a hot inner pipe 42 connecting the hot area 20 of the vessel to the outer cold area 58 of the water box and a cold outer annular pipe 44 connecting the cold inner area 60 of the water box to the cold outer area 22 of the vessel.

According to the invention and as is more particularly illustrated in FIG. 2, a safety sleeve 68 is arranged coaxially within the cold connecting pipe 44. The thickness of the wall of sleeve 68 is designed so as to resist the pressure in pipe 44, i.e. the pressure in the reactor primary circuit.

The length of sleeve 68 exceeds the length of the outer face of tube 46, in such a way that it can be supported and centered relative to said tube by means of elastic elements 70. The elastic elements 70 are arranged level with the ends of the outer face of tube 46 and are received in grooves 72 formed in sleeve 68. Preferably, the elements 70 are constituted by metal rings having inner and outer festoons. Due to their elastic properties, these elements prevent vibrations.

At each of its ends 73 sleeve 68 is extended beyond the annular elements 70 to define with the inner wall of tube 46 a relatively small calibrated clearance j. In the embodiment of FIG. 2, due to the direction in which sleeve 68 is fitted into the tube 46 the internal diameter of the tube and the corresponding external diameter of the sleeve 68 are slightly smaller on the side of water box 50 than on the side of vessel 10.

The inner tube 66 is supported by sleeve 68 by means of two series of fins 74 arranged in the vicinity of each of the ends of the sleeve. Tube 66 and sleeve 68 thus form a removable, monobloc or one-piece assembly which can be removed via vessel 10. To this end, the end of tube 66 entering water box 50 is slidingly received in a bore 76 formed in the wall 78 of the inner structure 62 of the water box and the dimensions of this end are such that it can freely traverse the outer tube 46 when the monobloc assembly constituted by tube 66 and slide 68 slides to the left in the case of FIG. 2.

In the same way, the end of the inner tube 66 which enters vessel 10 is slidingly received in a bore 80 formed in the basket-shaped member of core 16 and defines a shoulder 82 which normally abuts against the end of bore 80, when the tube 66 is in place, as illustrated in FIG. 2. A pin 84, accessible from the outside of vessel, can then be radially introduced into facing holes formed both in member 16 and in the corresponding end of tube 66 to axially immobilise the monobloc assembly constituted by tube 66 and sleeve 68. Finally, the sealing between each of the ends of tube 68 and bores 76 and 80 is ensured by two segments 86 and 88 respectively.

The operation of the nuclear boiler described with reference to FIG. 1 is identical to the operation of known nuclear boilers of this type and will not be described in detail here. However, it is pointed out that in the present embodiment, the primary liquid contained in vessel 10, pipes 42 and 44 and water box 50 of generator 48 flows in the direction of the arrows in FIGS. 1 and 2. Thus, the hot liquid leaving the reactor core 18 and entering area 20 of vessel 2 is routed by inner pipe 42 of each of the primary loops of the reactor, whereof only one is shown, towards the outer annular area 58 of water box 50 of the corresponding steam generator 48. The primary liquid then flows in the U-tubes 56 of the steam generator in such a way as to evaporate the secondary liquid contained in the upper part 54 of the said generator. The cooled liquid leaving the U-tubes 56 to enter the cold inner area 60 of water box 50 is then routed under the action of pump 64 into the cold outer area 22 of vessel 10 by the outer annular pipe 44. The primary liquid is then recycled into the reactor core 18 which it enters by passages 28 formed in the grating 26.

According to the invention, and as is more particularly illustrated in FIG. 2, if one of the outer tubes 46 connecting vessel 10 to steam generators 48 is fractured, the safety sleeves 68 make it possible to limit the resulting leakage flow to a relatively small, predetermined value. Thus, no matter what the shape and dimensions of the fracture occurring in the tube 46, i.e. both for a fracture along a generatrix and a fracture in a circumferential direction, the thickness of sleeve 68 is designed so as to resist the pressure in the primary circuit. Thus, the primary liquid can only escape through the fracture formed in the tube after passing through passages between the inner wall of the tube and the ends 73 of sleeve 68. The resulting leakage flow is therefore completely controlled by the calibrated clearance j defined between each of the ends 73 of the sleeve and the inner wall of tube 46.

In addition, sleeve 68 can be removed with the inner tube 66 to which it is fixed in the embodiment shown. The monobloc assembly constituted by these two members can be removed by manipulating the pin 84 from the outside of vessel 10, so as to extract the pin from the facing holes formed in the core-carrying member 16 and in the adjacent end of tube 66. The assembly formed by the tube and the sleeve is then displaced to the right with reference to FIG. 2, so as to disengage the left-hand end of tube 66 from bore 80 formed in member 16. The latter can then be extracted from vessel 10 after removing cover 12. The monobloc assembly constituted by tube 66 and sleeve 68 is then moved to the left with reference to FIG. 2 within vessel 10 and is easily extracted via the latter. For this purpose, the length of tube 66 is less than the internal diameter of the vessel. It is therefore possible to carry out an inspection during operation of the interior of the outer tubes 46.

Under normal operating conditions, the sleeve is exposed to no compressive stresses, which ensures that it is able to fulfil its function of limiting leaks of primary water if the connecting tube is fractured.

Finally, it should be noted that sleeves 68 also protect tubes 46 against thermal shocks and cycles occurring during transient operating periods of the reactor leading to modifications of the primary fluid flow rate or to modifications of the reactor power.

Obviously, the invention is not limited to the embodiment described in exemplified manner hereinbefore and in fact covers all variants thereof. Thus, the safety sleeve and inner tube can be formed by two independent members. The sleeve is then secured within the outer tube independently of the axial fixing of the hot connecting pipe by any appropriate means. In the same way, the inner tube securing means in the form of pin 84 can be modified or placed at the other end of the tube, i.e. on the side of the internal structure of the water box. The safety sleeve and inner tube can also be designed so as to be removable in a different manner from that described hereinbefore without passing beyond the scope of the invention. Thus, the diameter of bore 80 can be larger than the outer diameter of sleeve 68, which makes it possible to directly dismantle the latter after removing cover 12 by passing the sleeve through the bore and without dismantling the basket-shaped member. In this case, the sleeve length can obviously be less than the internal diameter of the basket-shaped member carrying the core.

What is claimed is:

1. A nuclear boiler comprising a vessel having an upper part sealed by a removable cover, a basket-shaped member carrying a reactor core and separating the vessel into a hot inner area and a cold outer area, at least one steam generator positioned within the vessel and comprising a tightly sealed enclosure and a tube plate separating the enclosure into a primary part or water box and a secondary part, the tube plate carrying U-tubes having ends issuing into a cold area and a hot area of the water box defined by an inner structure, two linear, coaxial tubes defining an inner tube and an annular outer tube respectively connecting the hot areas and cold areas of the vessel and the water box, a removable safety sleeve having a wall designed to resist the pressure in the primary circuit of the boiler, and arranged coaxially within the outer annular tube and defining with the latter a calibrated clearance making it possible to limit to a given value the leakage flow if the outer tube fractures.

2. A nuclear boiler according to claim 1, wherein each of the ends of the safety sleeve extend beyond the outer wall of the outer tube and defines a calibrated clearance with the inner wall of said tube.

3. A nuclear boiler according to claim 1 or 2, wherein the safety sleeve is connected to the inner tube by fins, so that it forms a monobloc or one-piece assembly with said tube.

4. A nuclear boiler according to claim 3, wherein the inner tube is removably fixed to the core-carrying member, the length of the monobloc assembly formed by the inner tube and the safety sleeve being less than the internal diameter of the vessel, in such a way that said assembly can be extracted via said vessel after removing the cover.

5. A nuclear reactor according to claim 1, wherein elastic annular elements are located between the safety sleeve and the inner wall of the outer tube.

6. A nuclear boiler according to claim 3, wherein the inner tube is removably fixed to the inner structure of the water box, the length of the monobloc assembly formed by the inner tube and the safety sleeve being less than the internal diameter of the vessel, in such a way that said assembly can be extracted via said vessel after removing the cover.

* * * * *